(12) United States Patent
Brumfield

(10) Patent No.: US 8,055,679 B2
(45) Date of Patent: Nov. 8, 2011

(54) WEB BROWSING CONFIGURATION AND COLLABORATIVELY FILTERED WEB SITES FOR PERSONAL PRODUCTIVITY

(75) Inventor: Sara Carlstead Brumfield, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 12/252,690

(22) Filed: Oct. 16, 2008

(65) Prior Publication Data

US 2010/0114963 A1 May 6, 2010

(51) Int. Cl.
*G06F 17/30* (2006.01)
(52) U.S. Cl. .......................... 707/781; 707/783
(58) Field of Classification Search .............. 707/781, 707/783, 784, 785; 726/28, 1, 2, 4; 709/225
See application file for complete search history.

(56) References Cited

U.S. PATENT DOCUMENTS

| 6,286,001 | B1 | 9/2001 | Walker et al. |
| 6,745,367 | B1 | 6/2004 | Bates et al. |
| 7,503,075 | B2 * | 3/2009 | Sturms et al. .................. 726/28 |
| 2008/0066164 | A1 * | 3/2008 | Chebolu et al. ................. 726/4 |
| 2010/0058204 | A1 * | 3/2010 | Wilson .......................... 715/760 |

FOREIGN PATENT DOCUMENTS

WO  WO 2006054276  2/2005

* cited by examiner

*Primary Examiner* — Hung T Vy
(74) *Attorney, Agent, or Firm* — Jeffrey LaBaw; Darcell Walker

(57) ABSTRACT

Multiple users generate separate websites, which are compiled into an approved list of websites for an organization. This list of approved websites is saved in a database location. When a user desires to access the communication network, this method of this invention detects and intercepts the access attempt and determines whether the website identified in the access attempt is accessible by the particular user. The determination of whether the desired website is accessible to the user will depend on certain defined criteria such as time of workday or length of a connection session of the user with the communication network.

12 Claims, 7 Drawing Sheets

WEB BROWSING CONFIGURATION AND COLLABORATIVELY FILTERED WEB SITES FOR PERSONAL PRODUCTIVITY

FIELD OF THE INVENTION

This invention relates to a method and system for increasing personal productivity using web browsing and in particular to a method and system for collaboratively generating lists of websites and using filters to manage the use access to websites based on the information contained in the collaborative website lists.

BACKGROUND OF THE INVENTION

Global communication networks such as the Internet are a global system of interconnected computer networks that transmit to and receive data from various points on the network. These global communication networks are comprised of millions of private and public, academic, business, and government networks of local to global scope that are linked by copper wires, fiber-optic cables, wireless connections, and other technologies. These networks carry various information resources and services, such as electronic mail, online chat, file transfer and file sharing, online gaming, and the interlinked hypertext documents and other resources.

Today, common uses of global communication networks include electronic mail applications. The concept of sending electronic text messages between parties in a way analogous to mailing letters or memos predates the creation of the Internet. A second use is for remote access applications. These networks allow computer users to connect to other computers and information stares easily, wherever they may be across the world. The low cost and nearly instantaneous sharing of ideas, knowledge, and skills has made collaborative work dramatically easier. Not only can a group cheaply communicate and test, but the wide reach of the Internet allows such groups to easily form in the first place, even among niche interests. These networks provide a means for a computer file can be e-mailed to customers, colleagues and friends as an attachment. The Internet enables many existing radio and television broadcasters provide Internet "feeds" of their live audio and video streams. In addition, global networks provide a means for voice communications. There has been a recent increase in the use of these networks for telephone applications.

Global communication networks have provided a convenient vehicle to perform both personal and professional tasks. The heavy use of these networks for all types of tasks has created a dilemma in the workplace. In some instances, workers spend so much time on these communication networks, that personal productivity is impacted. As a result, many personal productivity websites and blogs recommend reducing the amount of website surfing you do by either shutting down your web browser or creating a script that detects 10 minutes or more of web browsing and reminds you that you should be working. While these solutions are good if you don't need to access the web for your actual work, they are not so good if you need to use the web to research problems, review documents or otherwise do your work.

Solutions exist that are used to limit how much of the web children can surf, (i.e. NetNanny). Similar filters are also in use in some corporations. This solution is different because it is built into the web browser and is configurable by the user for personal productivity purposes. It gives the individual control and allows for self-monitoring.

Web browsers currently have the concept of "profiles" but those profiles are limited in that they don't control the content that you can access and require a restart to switch from one profile (generally a user) to another. Some people use 2 different web browsers (IE and Firefox, for example) to set up "work" and "play" interfaces.

SUMMARY OF THE INVENTION

This invention proposes a "modal" web browser. The web browser is one that has settings and filters for different types of activities ("work", "play" for example). Each of those modes would be set on a timer to that you only allow yourself to be in the "work" mode from 9 AM to noon, in order to increase your personal productivity.

The embodiments of the present invention employ lists of websites to be used as part of the personal productivity management process. These lists are based on a user's initial list of "approved work sites" from the user's bookmarks, or sections of the user's bookmarks. These lists are combined to create a larger "approved" list.

In an embodiment of the method of the present invention, a list of websites is generated. This list can be assembled from individual website lists. Multiple users can generate separate websites, which would be compiled on a server into an approved list. This list of approved websites would be saved in some database location. When a user desires to access the communication network, this method detects and intercepts the access attempt and determines whether the website identified in the access attempt is accessible by the particular user. The determination of whether the desired website is accessible to the user will depend on certain defined criteria. For example, websites that are not work related websites may not be accessible or may not be accessible during certain times during the workday. Access to websites could also be based on time limits in which users can only access a particular website for a limited amount of time. When the website the determination is that the user can access the website, access is granted to the user. When the determination is that the website is not on an approved list, but is an allowable website, the user is granted access and the website is added to the approved list.

DETAILED DESCRIPTION OF THE INVENTION

The present invention provides a method and system that would manage access to certain network website locations.

Figure 1:
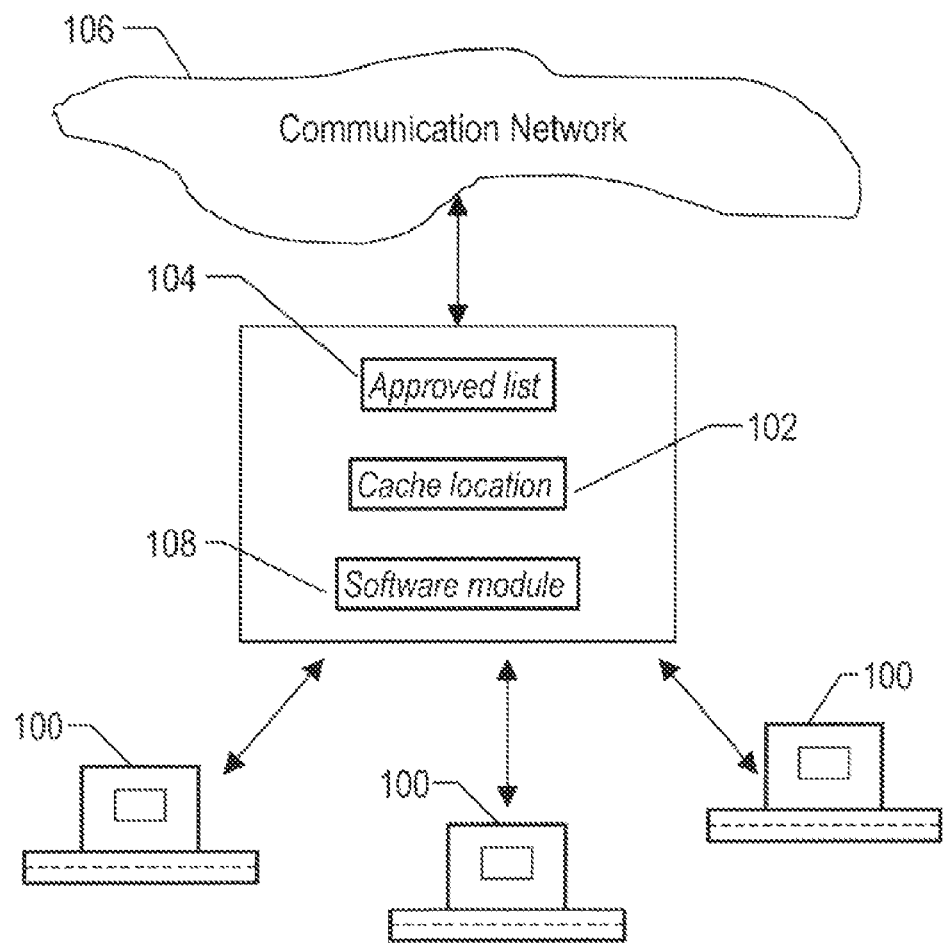
FIG. 1 is a configuration of a communication network and individual users for implementation of the present invention.

The objective of this management function is to increase productivity of the workers during the workday. The implementation of embodiments of this website management invention could be implemented through software stored on a network server machine. The system of the present invention shown in FIG. 1 could have a configuration that comprises the individual user terminals 100 in communication with a cache device 102 and a server 104. The server device 104 could serve a gateway to a communication network 106 such as the Internet. The service device contains a software module 108 that has the capability to collect individual website lists and combine these lists to create an approved list for the group of terminal users. For a particular organization, these users could be the employees of that organization. The server device 104 could also have a software module that manages user access to communication network by controlling the amount of time any one user can access the network at one time. Hie service device 104 could also manage the user access by controlling the particular website a user can access at any particular time. As will be discussed, the server can operate in various modes depending on the desires of a particular organization.

Figure 2:
FIG. 2 is a computer screen showing the mode option menu for selecting a mode to implement the method of the present invention.

FIG. 2 shows a terminal screen of a web browser through which one can activate various modes of the present invention. As shown, the tool bar contains various conventional functions including the 'File', 'Edit' and 'View' functions. In addition, there is a 'Bookmarks' function and a 'Mode' function. The 'Bookmarks' function is another conventional function. This function allows a user to save URLs for favorite websites and websites that the user frequently uses. Using the 'Bookmark' function enables a user to quickly access a particular website. The 'Mode' function is a feature added by the present invention. This function activates various website manage modes. The window 202 shows a menu of management options. The web browser would have a menu for "Mode" such as the following:

The "mode" would have options to do a number of things:
Create a mode, e.g. "Work"
Set rules for the 'Work' mode. For example, 'Work' would have a rule such as, "Only.abc.com sites" or "Only one of the domains associated with this set of bookmarks (your technical research bookmarks, for example).
There can also be a time range mode that serves as the default mode (e.g. 9 AM-12 PM). With this time range, from 9 AM to 12 PM, the system will only access to abc.com websites. Another function under the modes window can to allow the creation of collaborative filtering settings for the mode. These filters can include information such as; hat workgroup the user is part of, a username, and the server address to which a user's list of sites would be sent. The user could change mode by choosing the mode from the window. Modes would also change based on their time ranges set. Each mode could also have a different, history, bookmarks and plug-ins.

Figure 3:
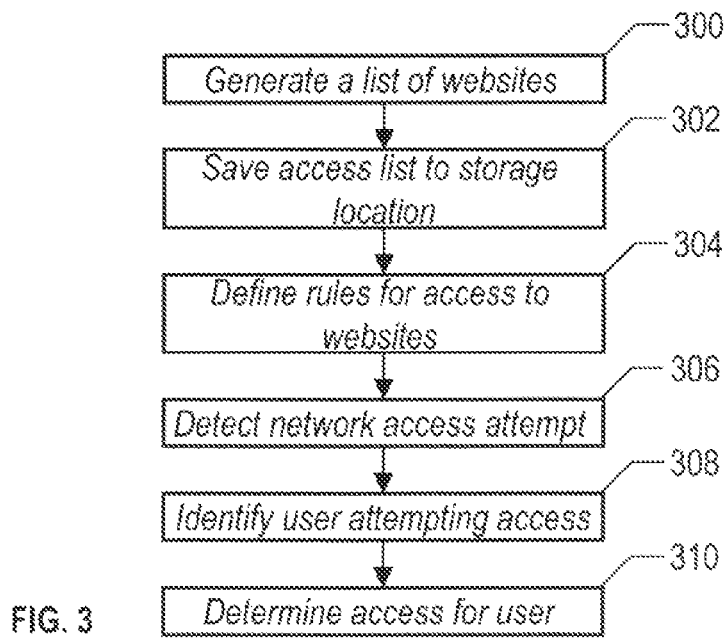
FIG. 3 is a flow diagram of the general steps in the implementation of the method of the present invention.

FIG. 3 illustrates a general flow diagram of the steps in the implementation of the method of an embodiment of the present invention. In the general application of the method of the present invention, during step 300 one or more users generates a list of websites (URLs) that they access via their computer terminals. One approach is to list sites that are related to the user's work. Each of the listed sites may have a common character element such as 'abc.com'. In step 302, these lists are saved in a server location such as server device 104 as previously discussed. These individual user lists are combined in some form to produce an approved list of websites. In the process of compiling an approved list, each website entry on a particular list could be reviewed and a determined made as to whether that particular website should be included on the approved list. Several different options can be employed as part of this screening or filtering process. As mentioned, if the site contains a certain character string, 'abc.com', the site could automatically go onto the approved list. When a potential site does not have the desired character string, but multiple users list that site, the fact that multiple users have that site may be enough to add that site to the approved list.

After the list has been accumulated and saved, step 304 defines a set of rules that will govern access to websites. As mentioned, these rules could contain access time limits to the communication, limits on access to certain types of sites at particular times of day or access to particular sites that are not on the approved list at various times. After the rules are defined and stored, the method moves to a monitor state and monitors and attempts to access the network. Step 306 detects an attempt to access the communication network. An access attempt could comprise clicking the browser icon on a user's terminal. At this point, the attempt to bring up the browser would be detected. In addition, step 308 identifies the user attempting the access. Steps 306 and 308 can be transparent to the user. These two steps do not prohibit the user from bring up the web browser. However, once the user brings up the web browser, the user will then attempt to access a website entering a website URL. When the user enters this URL, step 310 will make a determination of whether to allow the user access to that website. The access determination will be based on the previously defined rules.

Figure 4:
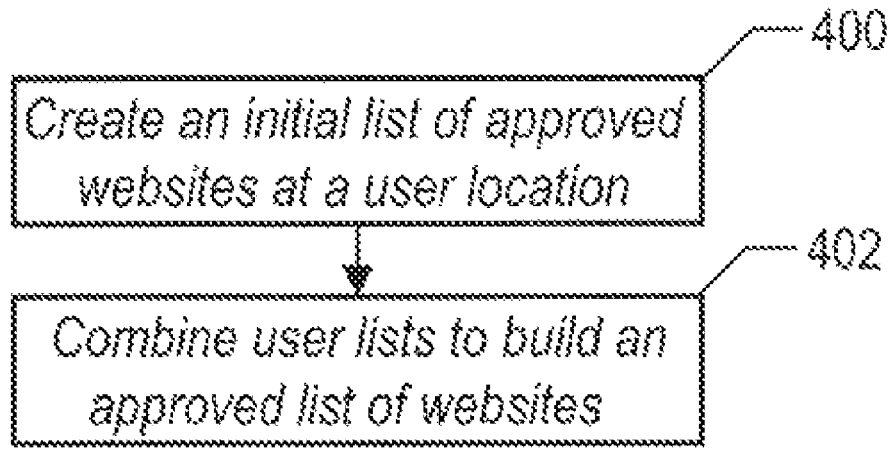
FIG. 4 is a flow diagram of the steps that generate an approved list of websites that will be accessible to the users.

A key element in the implementation of the present invention is the creation of a list of 'approved' websites that a user can access at a specified time. FIG. 4 is a flow diagram of the steps that generate an approved list of websites that will be accessible to the users. In step 400, each user will create and submit a list of websites that the user routinely accesses. As mentioned, this list can be restricted to work related sites or can also include other personal websites. The list can comprise only company related sites or can include other sites that may be related to an employee's job function. For example, an employee working for ABC Company may have a list of company websites containing the characters abc.us.com In the site's URL. However, that may also have job related websites that do not contain those characters in the site's URL. One example could be the patent office website www.uspto.gov. This website could be on an employee's website list even though it does not have the company characters in the URL. Each employee list will be combined in step 402 to create the 'approved' list of websites for the company. Alter the combining of all of the individual lists, there can be step of sorting this list to create a set of common sites that appeared on each individual list. These common sites could have a higher preference or priority which could result in employees having unlimited access to them.

Figure 5:
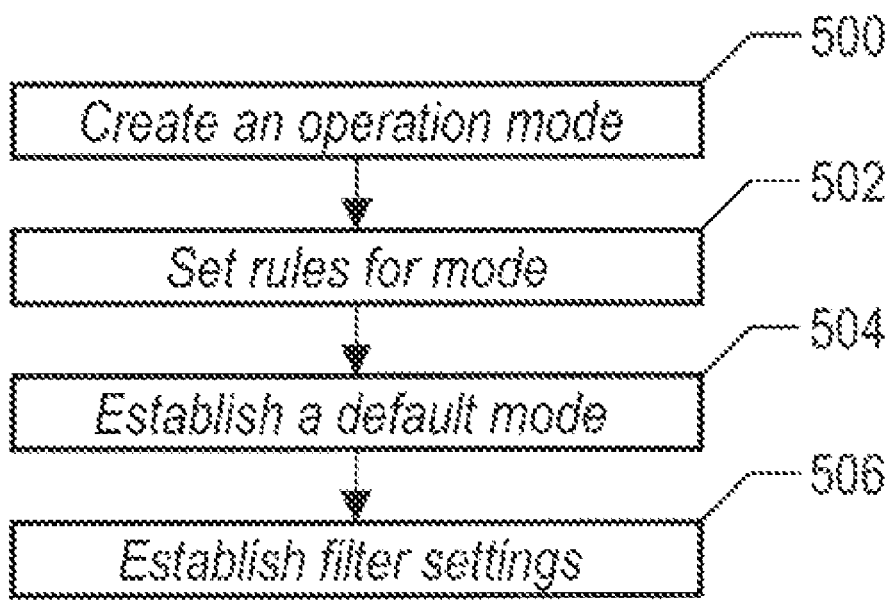
FIG. 5 is a flow diagram of the steps to create a mode operation and establish filter settings.

In addition to having a list of 'approved websites', the present invention also a set of rules that govern and manage access to websites via the communication network. FIG. 5 is a flow diagram of the steps to create a mode operation and establish filter settings. Step 500 creates a mode of operation for the management of access to the network. Referring to FIG. 2, window 202 shows mode options, which include a 'work' mode and a 'play' mode. With this system, there is ability to determine how one manages the websites. The 'work' mode may govern the access to websites at certain times of day. These day times may be restricted times which only allow access to work related sites. The 'play' mode may be at times when the user has general access to the network, but there may be certain types of websites that are accessible even in the 'play' mode. The mode may be during unrestricted times of day. Step 502 establishes a set of rules that govern access to websites in each defined mode. These rules could vary for different modes and could be related to time of access (the time of day one can access a particular site), length of access (a time limit on how long one can have access in a particular session) or access to particular types of websites. Step 504 can establish a default mode. In this step, if the user does not designate a particular mode, the method will automatically default to a certain mode. Since a purpose of this method is personal productivity in the workplace, a default mode could be the 'work' mode. Step 506 establishes filter settings that provide for the implementation of rules in the various modes. Filter settings identify the collaboratively built list on the server, which should be used to limit websites to be browsed.

Figure 6:
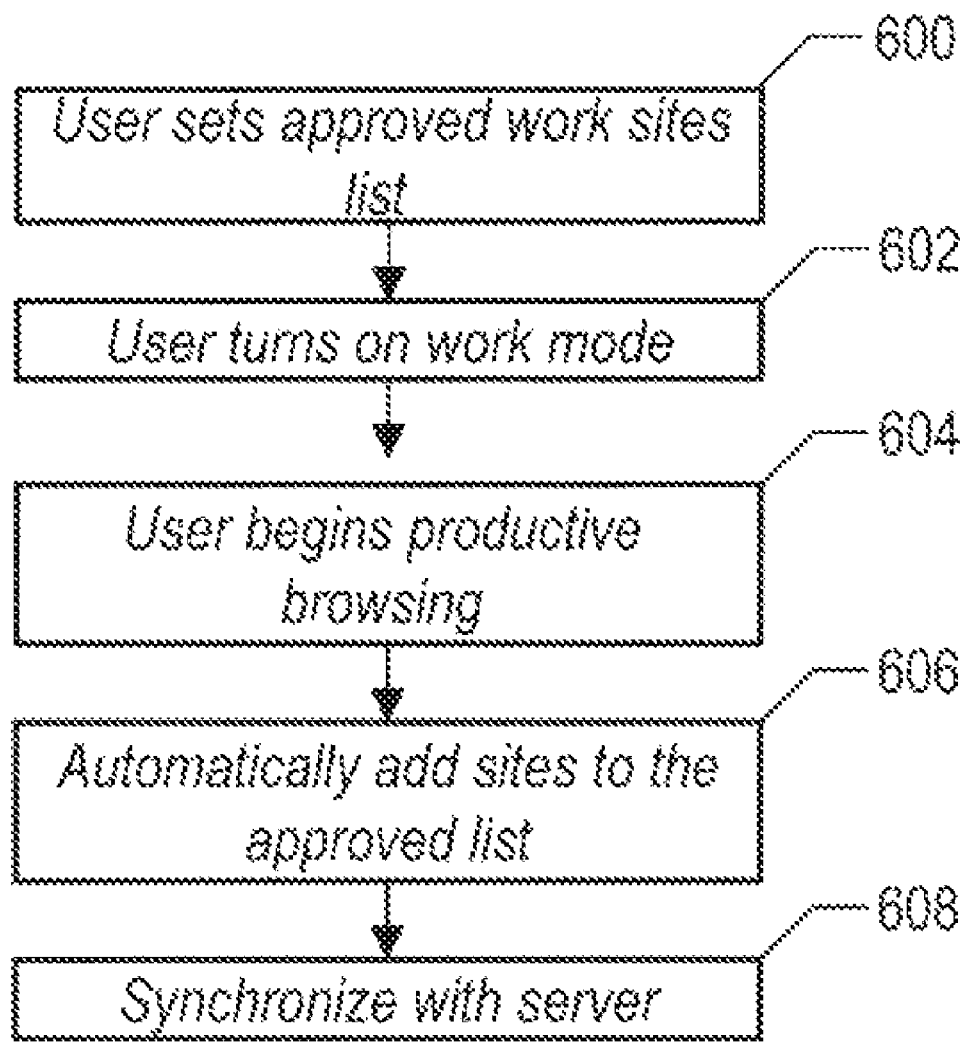
FIG. 6 is a flow diagram of the steps to automatically add websites to an approved list of websites.

A realistic part of communication networks is the constant changing of websites. Frequently, new websites are created and other websites are removed from the network. With the constant change in websites, the present method has to have the capability to modify initially created website lists. FIG. 6 is a flow diagram of the steps to automatically add websites to an approved list of websites. In this method, in step 600, the user establishes an approved website list as previously described in FIG. 4. In step 602, the user begins to access the network and defines the mode in which the system will operate. Once the mode is defined and the user has access to the network, in step 604, the user begins productive browsing. During the browsing activity when the user is working, the user may discover a website with information that is helpful to the user. In conventional browsing, if the user wants to note this site for future reference, the user would bookmark the site. In the method of the present invention, the user could also bookmark the website. However, step 606 would also automatically add an identified website to the approved list. In an alternate approach, there may be some processing before the new website is added to die approved list. In step 608, the step of adding the website is synchronized with the server. This step updates the information on the server to account for the newly added website. This step is important because the main version of the approved list will generally reside on the server.

Figure 7:
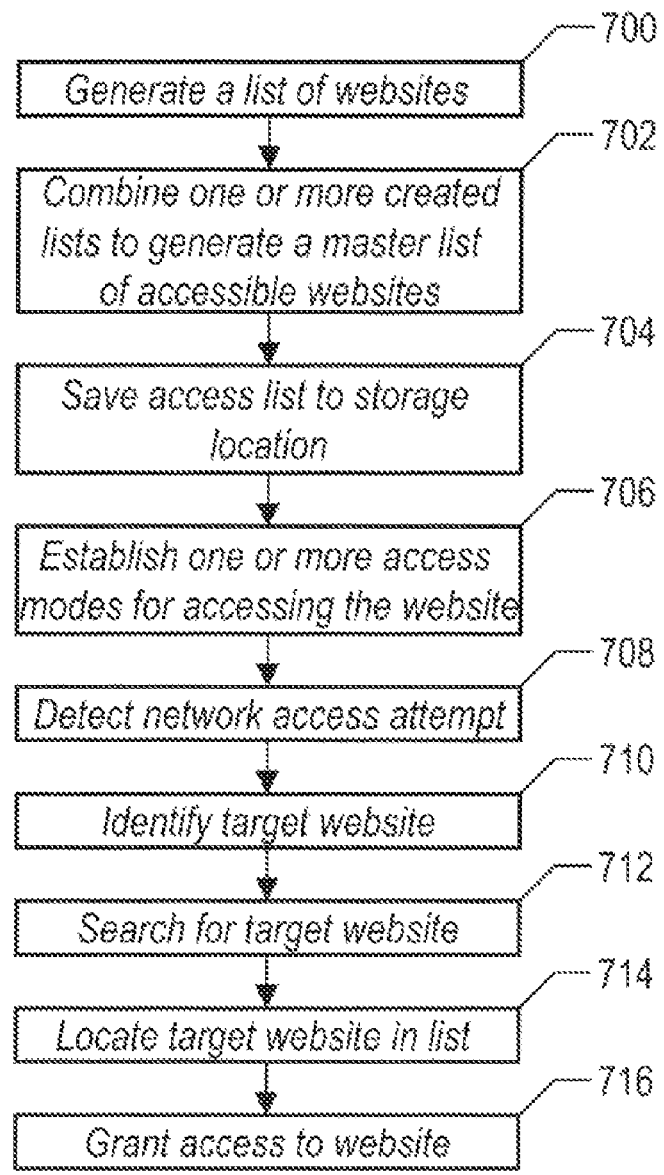
FIG. 7 is a flow diagram of the steps in an implementation of the method of the present invention.

As previously mentioned, a primary function of the present invention is to management access to website on communication networks in order to impact work productivity. FIG. 7 is a flow diagram of the steps in an implementation of the method of the present invention. Step 700 generates multiple lists of websites at each. These websites can be from individual employees or from various groups or sections of an organization. Step 702 combines the separate lists and generates a master list of accessible websites. This list can be an accumulation of the separate list or there can be some manipulation and filtering of the separate list to produce a final approved or master list. The list is saved in the server in step 704. In addition to saving the master list, there can be an option to also save the multiple lists from which the master list was generated. Another step in the initialization aspect of this method is step 706, which establishes one or more modes for accessing websites on the communication network. Steps 700 through 706 represent the initialization phase of the method.

At this point, the method goes into a monitor mode where it waits for a user to attempt to access the communication network. In step 708, the method detects a network access attempt. Part of this detection step involves a determination of when a user has accessed the network's home page. When the user accesses the home page, the user will enter a URL for a particular website referred to as the target website. Step 708 intercepts the access attempt to the target website. Next, step 710 identifies the target website and the user that is making the access attempt. Step 712 searches the generated website list fort the target site. Depending on the configuration of the system, the search can be local and depending on the results can be expanded to a general search of the generated list. During the search, step 714 locates the target website in the list. Step 716, then grants the user access to the website in accordance with any rules that govern the particular access.

Figure 8:
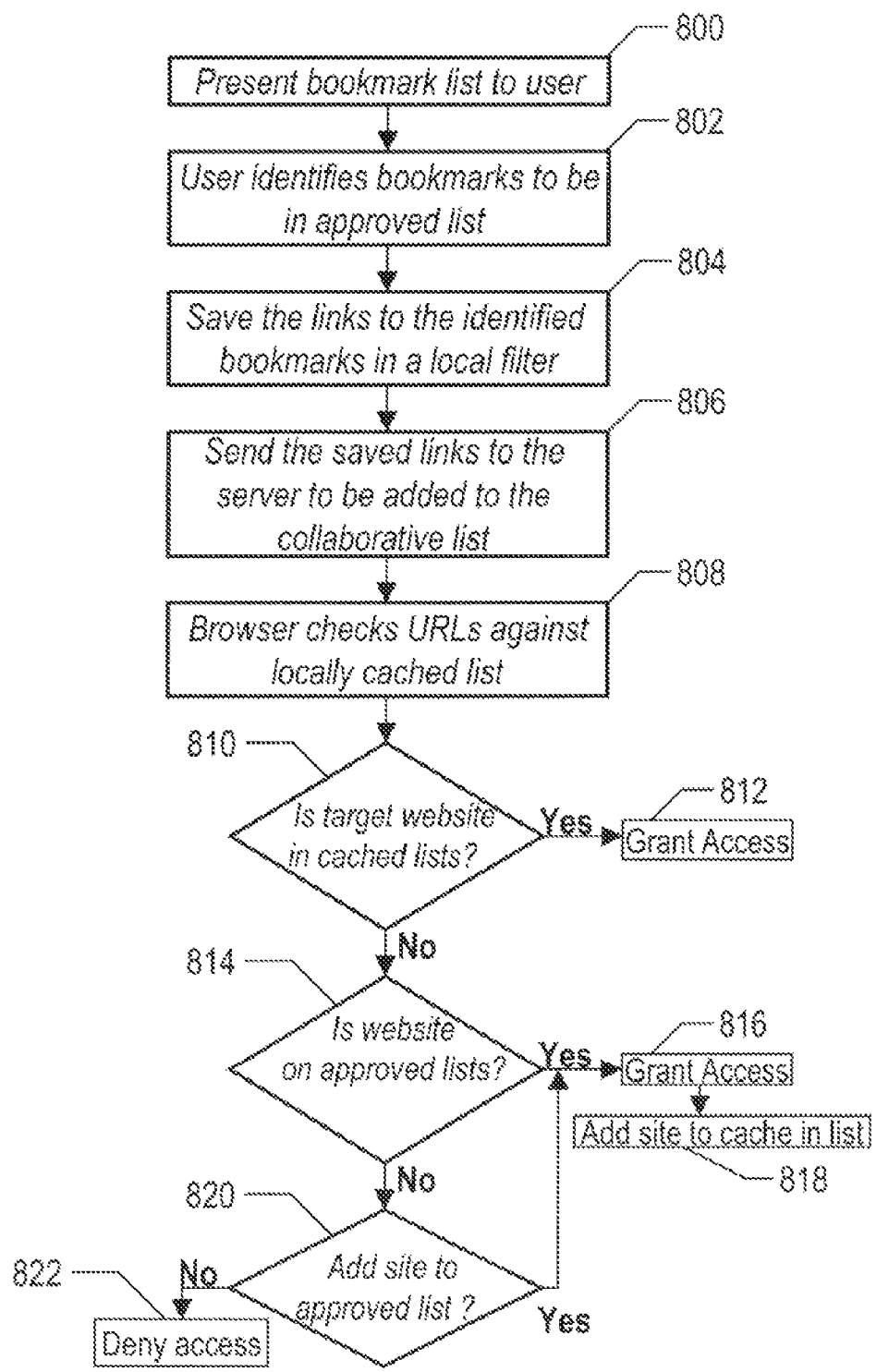
FIG. 8 is a flow diagram of the steps in an implementation of the method of the present invention having cache and approved website lists.

FIG. 8 is a flow diagram of the steps in an alternate implementation of the method of die present invention which has a cache and approved website lists. In this embodiment, step 800 presents a bookmark list to the user. This activity takes place during the initial creation of the list as described in step 700. This bookmark list contains all of the current bookmarks of the particular user. In step 802, the user is prompted to review the bookmark list and identify bookmarks to be included in the approved website list. Step 804 saves the links for the identified and book marked sites. These sites can be saved in a local filter or memory location. These saved bookmark linked are sent to the server location in step 806. At the server, the approved list of websites is generated using the information in the saved bookmark list that sent to the server in step 806. As with method described in FIG. 7, steps 800 through 806 comprise an initialization phase of the method. At this point, the method enters a monitoring state.

When a user accesses the communication network and attempts to access a target website, step 808 identifies the target website and searches for the target website in the local cached website list. The local cached list could be the bookmark list of the user making the access attempt. Step 810 determines whether the target website is in the cached list. In addition, to determining whether a site is present in the cached list, this step can also determine accessibility to the site based on the established rules that govern website access. If the determination is that the target website is in the cached list and is accessible, the method moves to step 812 which grants the user access to the site. Referring to step 810, if the determination is that the target is not on the cached list, the method moves to step 814 which determines whether the target website is in the approved list. This approved list can be the combined and generated list of the entire bookmark lists from the various users in the system. If the determination is the website is on die approved, step 816 grants the user access to the website. Step 818 then adds the website to the cache list. This cache list can also include frequently used websites. Referring back to step 814, if the site is not on the list, die user can be given foe opportunity to add the site to the list in step 820. Again, certain rules can apply to govern the ability to add certain sites to die list. If the user wants to add the site, step 818 adds website to the cache and approved lists. The user is then granted access to the website. If the website does not meet certain criteria to be on the approved list, step 822 denies the user access to the target website. Referring back to step 816, when the user is granted access to a website, depending on the rules for allowing that access, certain timers may be activated to monitor and manage the website access such that the access is within the rules for access to dial target site.

Figure 9:
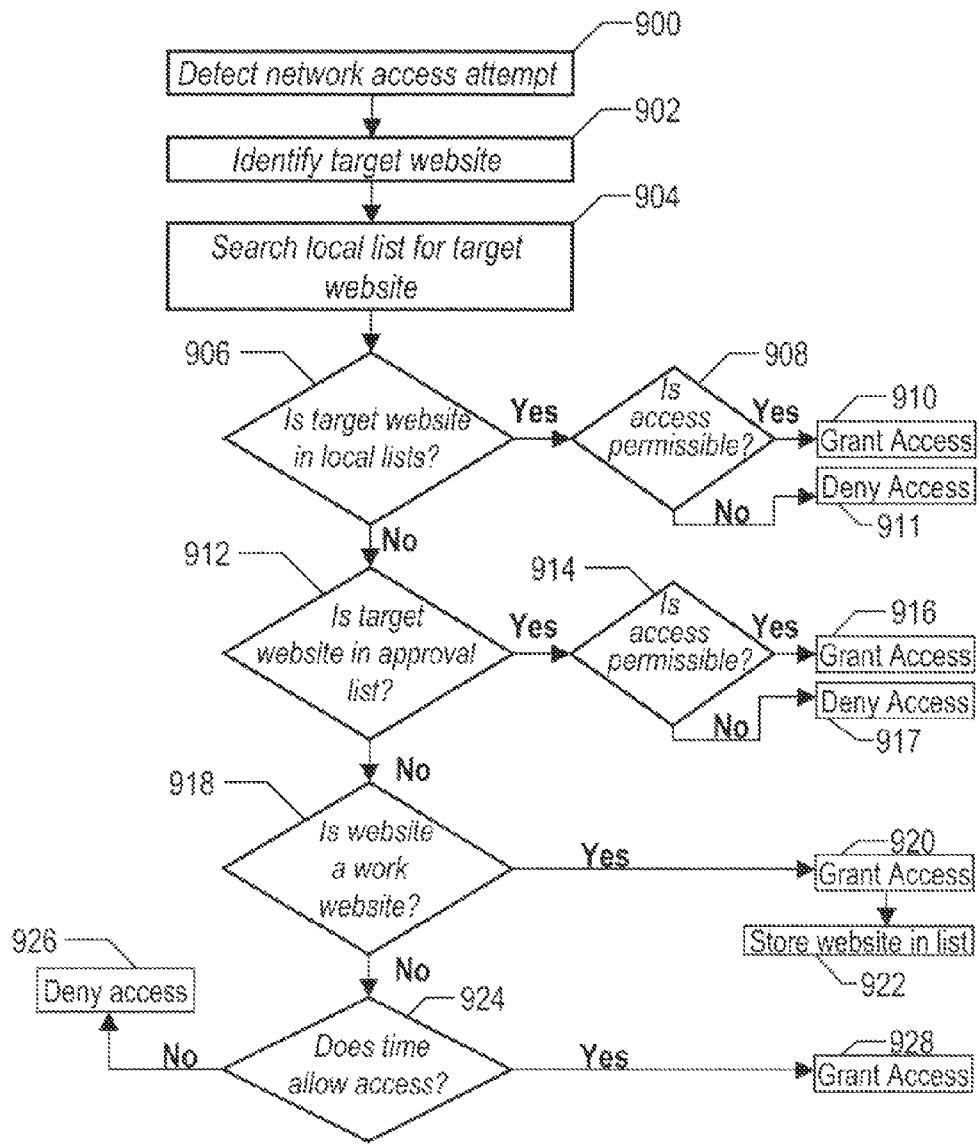
FIG. 9 is a flow diagram of the steps in an implementation of the method of the present invention having approved lists and time limit filters.

FIG. 9 is a flow diagram of the steps in an implementation of the method of the present invention having approved lists and time limit filters. This method focuses on the access and management phase as opposed to the initialization phase. This phase begins with the detection of a network access attempt in step 900. As in other implementations of the invention, step 902 identifies the target website. Step 904 searches the local cache for the target website. When the determination of step 906 is that the target website is on the list, step 908 determines whether access is permissible at this time. This determination is based on the rules that govern access to websites. If access to the target is permissible, step 910 grants access to the target website. If the access to the target website is not permissible, step 911 denies the access attempt. Referring back to step 906, if the determination is that the target website is not on the local list, the method moves to step 912 which determines whether the target site is on the approved list. If the target site is on the approved list, step 914, similar to step 908 determines whether access is permissible to that site at the present time. For this step, permissibility may not allowed if the target site is not from the specific user, but is from the user's supervisor. There are certain work sites in an organization that are not accessible to everyone in the organization. If access to the target is permissible, step 916 grants access to the target website. If the access to the target website is not permissible, step 917 denies the access attempt.

Referring back to step 912, if the target site is not on the approved list, there is determination in step 918 of whether the target site is a work related site. Again, this determination is based on defined rules or on user inputs. If the determination is that the target is a work site, step 920 grants access to the target site. Prior access determinations in steps 908 and 914 were based on permissibility at that time. Depending on the particular rules that are in place, the permissibility determination may not be necessary. For example, there can be a rule that work related websites are always accessible. Following the access grant in 920, this new website is stored in the approved list and optionally in the local list in step 922. Referring to step 918, if the determination is that the target site is not a work related site, but permissibility is allowed, there can be a determination in step 924 of whether access is allowable based on time restriction rules. In particular, if the access attempt occurs at the time when only work related websites are accessible, then step 926 would deny access to the target she. If there are no time restrictions, step 928 could allow the user access to the website.

As mentioned, the present invention could have filter mode. One implementation of this mode could be as follows. In the initial phase, the user sets his/her "approved work sites" list. The UI presents the user' bookmarks (either locally or on a server like delicious) and either use checkboxes to include the links in different sections or select the tags used by your work bookmarks. The links are saved on the local filter list (basically a cache) to be used by the browser. The links are then sent to the server to be added to the collaboratively built list. In the implementation phase, the user turns on Work Mode. The user then begins productive browsing on the communication network. As the user browses, the browser first cheeks domains/URLs against the locally cached list. If the site is on the list, yon are allowed to go to the site. If the site is not on the locally cached list, a request is sent to the server to determine if the list is on the group's approved site. If the site is on the list, the user is allowed to go to the site. The site is added to user's locally cached list.

Another feature of the present invention can be the ability to automatically add things to the "approved" list (configurable settings). Links from a user's work email should be added to the approved list automatically. Links that are "X steps" (1 or 2, usually) away from a site on the approved list can also be added. The newly added sites from the user's local list are sent to the server to be used by the rest of your workgroup.

The present invention can also have a variety of search features. Based on the mode a user is in, the user could only show search results to sites that are on the user's filtered list. Only use search terms that are on a filtered list. This could be accomplished by providing search engines access to the server with the collaboratively built list or by building a search engine into the server software where the collaboratively built list resides.

It is important to note that while the present invention has been described in the context of a folly functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape floppy disc, hard disk drive, RAM, and CD-ROMs.

I claim:

1. A method for managing web browser access on communication networks in order to increase personal productivity comprising:
    generating multiple lists of approved website links, each list representing websites commonly used by one or more users during daily activities;
    compiling, the website links in the multiple generated lists into one master list of accessible websites;
    storing the links of the websites on the compiled master list;
    detecting an attempt by a user to access a website location on a communication network;
    identifying the user attempting the access;
    identifying a target website of the access attempt;
    determining whether the target website is accessible to the user attempting the access by defining any time access requirements, defining any requirements for the specific user making the access attempt, determining whether all time access and user requirements are met and approving the access attempt when the determination is that all time and access requirements are met;
    if target access is approved, determining whether the target website is in a local storage location of the user making the access attempt;
    when the determination is that the target website is not a local storage location of the user making the access attempt, determining whether target website is on the master list of accessible websites;
    granting access when the determination is that the target website is on the master list; and
    adding the target website to the local storage location of the user making the access attempt.

2. The method as described in claim 1 wherein said website links compiling step comprises:
    defining criteria for inclusion on the master list;
    sorting, the website links on the multiple list according to the defined criteria; and
    placing the website links that meet the defined criteria on the master list.

3. The method as described in claim 1 wherein said storing further comprises:
    storing the master list in a general network location;
    storing one or more of the multiple website lists in a local storage location, the one or more multiple website list comprising website commonly used by user originally supplying the one or more multiple website lists.

4. The method as described in claim 3 wherein said determination of target accessibility further comprises: searching the local storage location of the identified user making the access attempt for the target website, wherein location of the target website in the local location indicates a satisfaction of accessibility requirements.

5. The method as described in claim 1 further comprising before said detecting an attempt, establishing multiple access modes for accessing a website on the saved list.

6. The method as described in claim 1 wherein said storing of links to websites on the compiled list further comprises:
   storing links identified by a user in a local storage location; and
   sending the stored links identified by a user to a main storage location, the stored links becoming part of the links of the compiled master list.

7. The method as described in claim 6 wherein said determining whether the target website is accessible to the user attempting the access further comprises:
   determining whether target website is in a local storage location of the user making the access attempt; and
   accessing the target website when the determination is that the target website is in the local storage location of the user.

8. The method as described in claim 6 further comprising when the determination is that the target website is not a local storage location of the user making the access attempt:
   determining whether to add the target website to the master list of accessible websites; and
   adding the target website to the master list of accessible websites.

9. The method as described in claim 6 wherein said determining whether the target website is accessible to the user attempting the access further comprises:
   determining whether target website is in a local storage location of the user making the access attempt;
   when the determination is the target website is in the local storage of the user making the access attempt, determining whether the access attempt is permissible, based on predetermined access criteria; and
   accessing the target website when the determination is that the access attempt is permissible.

10. The method as described in claim 6 wherein said determining whether the target website is accessible to the user attempting the access former comprises:
    determining whether the target website is in a local storage location of the user making the access attempt;
    when the determination is that the target website is not a local storage location of the user making the access attempt, determining whether target website is on the master list of accessible websites;
    when the determination is that the target website is on the master list of accessible websites, determining whether the access attempt is permissible, based on predetermined access criteria; and
    accessing the target website on the master list of accessible websites when the determination is that the access attempt is permissible.

11. The method as described in claim 6 wherein said determining whether the target website is accessible to the user attempting the access further comprises:
    determining whether the target website is in a local storage location of the user making the access attempt;
    when the determination is that the target website is not a local storage location of the user making the access attempt, determining whether target website is on the master list of accessible websites;
    when the determination is that the target website is not on the master list of accessible websites, determining whether the target website is a work website;
    when the determination is that the target website is a work website, storing the target website on the master list of accessible websites; and
    moving to granting access when the determination is that the target website is on the master list.

12. The method as described in claim 6 wherein said determining whether the target website is accessible to the user attempting the access further comprises:
    determining whether the target website is in a local storage location or the user making the access attempt;
    when the determination is that the target website is not a local storage location of the user making the access attempt, determining whether target website is on the master list of accessible websites;
    when the determination is that the target website is not on the master list of accessible websites, determining whether the target website is a work website;
    when the determination is that the target website is not a work website, determining whether access to the target website is permissible based on predetermined criteria; and
    moving to granting access when the determination is that access so the target website is permissible based on the predetermined criteria.

* * * * *